June 10, 1930.  C. B. GRAY  1,762,392
SHEARING MECHANISM
Filed Nov. 24, 1928

WITNESS
E. Lutz

INVENTOR
Charles B. Gray

Patented June 10, 1930

1,762,392

UNITED STATES PATENT OFFICE

CHARLES B. GRAY, OF MILLBOURNE, PENNSYLVANIA

SHEARING MECHANISM

Application filed November 24, 1928. Serial No. 321,683.

My invention relates to shearing devices, more particularly to those of the portable, motor-operated type, and it has for an object to provide apparatus of this character having such an arrangement of blades that curved cutting or shearing may be readily effected. The arrangement of blading having this capability also makes possible parts which are sufficiently rigid or rugged that cutting or shearing of a wide variety of materials may be accomplished. A further object, therefore, is to provide a relatively strong and durable shear.

So far as I am aware, the cutting elements of motor-operated shears have followed conventional shear or scissors practice in that the blades usually extend parallel to the plane of shear movement. I have departed radically from this practice in order to provide a more satisfactory shear and one which is durable and may be used for shearing relatively heavy material, such as tin or sheet iron. First of all, I provide shear blades which are disposed transversely, or substantially normally, with respect to the plane of shear movement. This makes possible a very strong structure, for the blades may be carried by the inner faces of terminal portions of relatively rigid pivoted arms or members so that the terminal portions may reinforce the blades. This arrangement is also advantageous in that adjustment does not depend upon the pivot, the blades being adjustable relatively to the arms to bring them to proper shearing position. It is, therefore, a further object of my invention to provide a relatively strong shear and one which depends solely upon adjustment of the blades relatively to the arms to bring the blades to proper cutting position.

A further object of my invention is to provide a shear, particularly of the motor-operated portable type, which is capable of being readily used to make curved cuts of relatively small radii without interference due to catching or buckling of the material. Due to the way the blades are mounted, the arms may be so formed that the sheared material may readily pass thereover when making a curved cut.

A further object of my invention is to provide a shear wherein wedging out of material is minimized. To this end, one of the blades may be roughened so as to resist outward movement of the material.

A further object of my invention is to provide a portable shear provided with a frame which supports both the motor and the shear blades and which carries a compact arrangement of reduction gears and mechanism for connecting the motor to at least one of the shear blades.

These and other objects are effected by my invention, as will be apparent from the following description and claims taken in connection with the accompanying drawings, forming a part of this application, in which:

Figure 1:
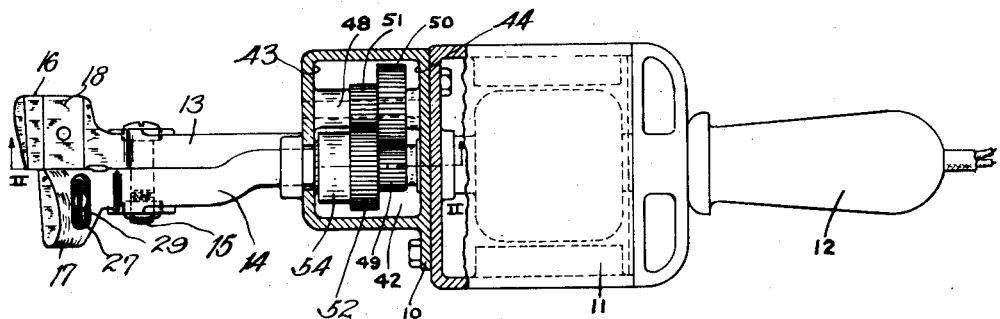
Fig. 1 is a plan view of an apparatus made in accordance with my invention partly in section.

Referring now to the drawings more in detail, I show a frame structure 10 to which is connected, or which carries, the motor 11. A handle 12 is connected to the motor. The shear portion proper embodies arms 13 and 14 pivotally connected at 15 and provided with cutting elements, as hereinafter more particularly described. Relative movement of the pivotally connected shear arms 13 and 14 is preferably secured by the motor in a manner to be described.

The arms 13 and 14 are relatively rigid or heavy and they are provided with blade-carrying terminal portions 16 and 17, respectively, arranged beyond the pivot 15. Blades 18 and 19 are carried by the terminal portions 16 and 17 and such blades are disposed transversely, or substantially normally, with respect to the plane of oscillation or of shear movement. This arrangement of blades permits of relatively wide terminal portions, whereby adequate strength in the latter may be preserved.

As shown more particularly in the drawings, the terminal portions 16 and 17 are provided with seats 20 and 21, respectively, at the inner faces thereof and extending substantially normally with respect to the plane of shear movement. The blades 18 and 19 fit the seats and they are provided with cutting edges 22 and 23. The blades are secured in their seats by means permitting adjustment of the blades relatively to the terminal portions to bring the cutting edges into proper cutting relation, for example, I show the blades 18 and 19 provided with screws 24 and 25, respectively, whose shanks are arranged in transverse slots 26 and 27, respectively, of the terminal portions and whose heads are arranged in transverse counter slots 28 and 29, respectively. The blades may be brought into proper relation simply by setting them properly with respect to the arms, thereby removing this function from the arms and their pivotal connection.

Figure 3:
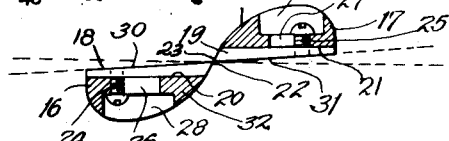
Fig. 3 is a sectional view of the blade-carrying portions of the arms.

The blades 18 and 19 preferably have their exposed side faces 30 and 31 relieved so as to clear, or not drag against, material being sheared. Referring to Fig. 3, it will be seen that the faces 30 and 31 are each relieved away from planes passing through the cutting edges and normal to the plane of shear movement.

The blades 18 and 19 are guided by the seats, the back faces of such blades fitting the bottoms of the seats 20 and 21, such seats preferably being of channel form. The front faces 30 and 31 (Fig. 3) of the blades are opposed or adjacent, though, of course, offset; and the adjacent bevelled surfaces of the blades intersect the front faces 30 and 31 at acute angles to provide the cutting edges 22 and 23.

The terminal portions 16 and 17 are relieved at the sides thereof opposite to the blade-carrying sides to facilitate the passage of material thereover when making a curved cut. Referring to Fig. 3, it will be seen that the terminal portions are rounded as indicated at 32 and 33, respectively, to permit the easy passage of material thereover. Due to the arrangement of the shear blades, the shear arms may be made quite strong and rigid without interfering with the passage of material thereover, since the terminal portions may have, where required, sections which are relatively wide and not so thick. In Fig. 1, the outer parts of the terminal portions are shown as being relatively wide and somewhat flattened.

Figure 5:
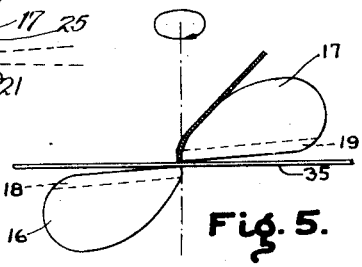
Figs. 5 and 6 are diagrammatic views illustrating a principle of operation occurring when making curved cuts.
Figure 4:
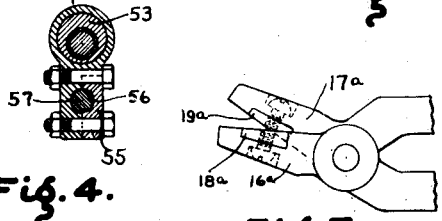
Fig. 4 is a sectional view taken along the lines IV—IV of Figs. 1 and 2.
Figure 6:
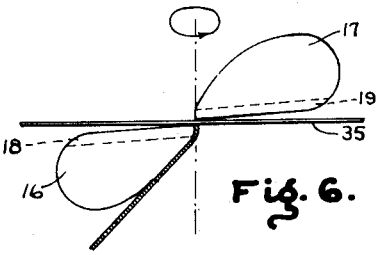

The facility with which curved cuts may be made will be more clearly understood upon reference to Figs. 5 and 6, which are diagrammatic representations of what takes place, these views being assumed to be taken in front of the shear. In Fig. 5, the sheet 35 is being sheared, the sheet being assumed to be perpendicular to the plane of the paper and the shear being assumed to be shearing the sheet 35 toward the reader. If the shear is turned, as indicated by the arrow in Fig. 5, one sheared edge will readily pass over and above the relieved or curved upper surface of the terminal portion 17 while the other sheared edge passes below such portion. If the shear is turned in the other direction, as indicated in Fig. 6, the sheared edges will pass above and below the terminal portion 16. Due to the facility with which the sheared edges pass over the terminal portions without any crowding or buckling it is possible to cut along curves of very small radii. The relief of the blades, or rake thereof, to avoid dragging against the sheet is also diagrammatically illustrated in Figs. 5 and 6, wherein the blade 19 slopes upwardly at a small angle from the sheet 35 and the blade 19 slopes downwardly from the sheet.

Figure 2:
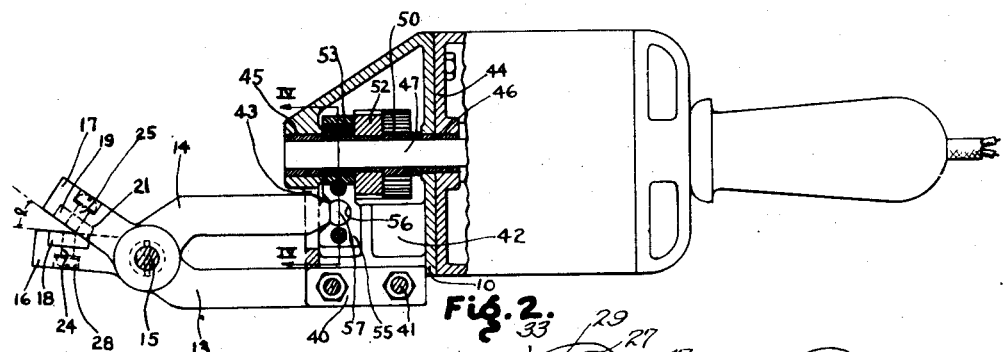
Fig. 2 is a side elevation of the apparatus shown in Fig. 1 and having a portion of the gear box removed to show gearing features.

The angle defined by the blade, the angle $\alpha$ in Fig. 2, may be varied. Although, this angle changes during the cutting cycle, if shearing takes place with oscillatory motion, the change is not so great for the reason that the amplitude of movement is rather small and the speed is high. The blades always define a V-space to facilitate the entrance and continuous feeding of material. The desirability of this will be evident from the operation of ordinary scissors whose blades must be opened to place material therebetween and whose blades are moved toward and from each other through a suitable angle in making cuts beyond the limit of one stroke. It is old in the art of motor-operated shears to avoid the effect of complete closure of blades in preventing the feed of material, for example, United States Patents 741,930 of October 20, 1903, 859,665 of July 9, 1907, 1,198,923 of September 19, 1916, 571,160 of November 10, 1896, 1,129,684 of February 13, 1915, show that this difficulty has been overcome in two ways, (1) by incomplete closure of blades and (2) by the provision of expedients avoiding the undesirable effects of complete closure, and I avoid this difficulty by the first method.

Figure 7:
Figs. 7 and 8 are detail fragmentary views showing a slight modification.
Figure 8:
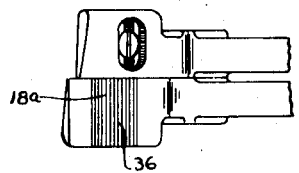

The angle $\alpha$ just referred to may be varied by grinding back the inner faces of the terminal portions and the blades, as shown in Fig. 7, where the terminal portions $16^a$ and $17^a$ and the blades $18^a$ and $19^a$ are ground back, the blades being trapezoidal in section. If the angle is large it may be desirable to roughen one or both of the blades; for example, the stationary blade $18^a$, in Fig. 8, is roughened at 36 to prevent wedging out of material. This roughening may be of any suitable type, for example, knurling or longitudinal ridges.

Referring again to Figs. 1 and 2, the lower shear arm 13 is fixedly secured to the frame structure in any suitable manner, as by means of the flange means 40 on the frame structure 10 and bolts or rivets 41 for securing such arm to the flange means.

The frame structure 10 includes a gear box or space 42 having end walls or members 43 and 44 provided with bearings 45 and 46 for the motor shaft extension 47. A stub shaft 48 is arranged in the box or space 42 and its ends are supported by the end walls or members 43 and 44.

A pinion 49 is secured to the motor shaft extension 47 and it meshes with a gear 50 mounted on the stub shaft. A pinion 51 mounted on the stub shaft and connected to the gear 50 meshes with a gear 52 rotatively mounted on the motor shaft extension 47. An eccentric 53 is also rotatively mounted on the shaft extension 47 and it has a strap 54 formed with an extension 55 provided with a socket 56 for the ball end 57 of the upper movable arm 14. It will, therefore, be apparent that the gearing provides for two reductions of the motor speed. As the pinion 51 and gear 50 on the stub shaft are adjacent, as the pinion 49, the gear 52 and the eccentric 53 are arranged closely side-by-side; and as the gear 52 and the eccentric are rotatively mounted on the motor shaft, it will be apparent that a very compact gear arrangement results. Not only is the gearing compact but it is strong, efficient and durable. The arrangement of gearing provides for the ball end of the upper arm being located fairly close to the motor, thereby making for minimum overall length. As the motor shaft extension is adequately supported by strong bearings, vibratory stresses are resisted by the frame structure and the motor and the transmission are protected.

From the apparatus described, the operation will be apparent. Shearing or cutting takes place due to the relative movement of the blades 18 and 19 and cuts of very small radii may be made on account of the ease with which the sheared edges pass over or by the arms.

It will, therefore, be obvious that I have provided a motor-operated shear having the following advantages:

(a) The frame structure not only provides for carrying the motor and the shear arms, but it provides a space for gearing; and the gearing provides for adequate speed reduction with high operating efficiency compactness and durability;

(b) Since the blades are arranged transversely with respect to the plane of shear movement they may be placed at the inner faces of the arms, whereby such arms give support to the blades and bear a large part of the shearing stress, that is, by having the arms arranged to back up the blades close to the cutting edges, bending moments and consequent blade breakages are reduced to a minimum;

(c) The blades may be adjusted without making any adjustment of the pivotal connection between the arms.

(d) The transverse arrangement of the blades makes possible a very strong and rigid construction of arms and a simple flat design of blade which may be readily sharpened and adjusted when required.

(e) By having the blades disposed transversely, not only are the aforementioned advantages realized, but the device is capable of making curved cuts of small radii without tearing, crowding, buckling or marring the material.

(f) Due to the aforementioned structural advantages and strength of the shear blades, the mounting thereof, the arms, and the transmission, the construction as a whole is strong and sturdy and may be subjected successfully to severe operating conditions, such as the shearing of metallic plate material.

While I have shown blades and seats, or guides for the blades, arranged substantially normally with respect to the plane of shear movement, it will be obvious that such blades and seats, or guides, may extend crosswise of that plane at any suitable angle as long as the proper relation of the shearing edges and the mode of adjustment are maintained. It is to be understood that by "plane of shear movement" is meant a plane tangent to the cutting edges and normal to the pivot axis.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a shear, the combination of relatively movable members having terminal portions provided with inner and opposed seats disposed crosswise of the shearing plane, blades having front and back faces arranged crosswise of the shearing plane and having at adjacent ends bevelled surfaces intersecting the front faces to provide cutting edges in said shearing plane, and fastening devices for holding the blades in place with respect to said terminal portions with the back faces thereof engaging said seats.

2. In a shear, the combination of relatively movable members having terminal portions provided with inner and opposed seats disposed crosswise of the shearing plane, blades having front and back faces arranged crosswise of the shearing plane and having at adjacent ends bevelled surfaces intersecting the front faces to provide cutting edges in said shearing plane, and fastening devices for holding the blades in place with respect to said terminal portions with the back faces thereof engaging said seats and including means providing for adjustment of the blades toward and from each other.

3. In a shear, the combination of relatively movable members having terminal portions provided with inner and opposed guide seats disposed crosswise of the shearing plane, blades fitting the seats and guided thereby when adjusted toward and from each other, said blades having front and back faces arranged crosswise of the shearing plane and having at adjacent ends bevelled surfaces intersecting the front faces to provide cutting edges in said shearing plane, and fastening devices for holding the blades in place with respect to said seats and providing, when loosened, for adjustment of the blades toward and from each other.

4. In a shear, the combination of relatively movable members having terminal portions provided with inner and opposed seats disposed crosswise of the shearing plane, blades having front and back faces arranged crosswise of the shearing plane and having at adjacent ends bevelled surfaces intersecting the front faces to provide cutting edges in said shearing plane, and fastening devices engaging the blades and terminal portions and effective entirely in directions substantially parallel to the shearing plane for holding the blades in place with the back faces thereof engaging said seats.

5. In a shear, the combination of relatively movable members having terminal portions provided with inner and opposed seats disposed crosswise of the shearing plane, blades having front and back faces arranged crosswise of the shearing plane and having at adjacent ends bevelled surfaces intersecting the front faces to provide cutting edges in the shearing plane, and means for securing the blades in place with respect to the terminal portions with the back faces engaging said seats and including at least one screw means engaging a blade and disposed in a slot in a terminal portion to provide, when loosened, for relative adjustment of the blades.

6. In a shear, the combination of relatively movable members having terminal portions provided with inner and opposed channels extending crosswise of the shearing plane, blades having front and back faces arranged crosswise of the shearing plane and having at adjacent ends bevelled surfaces intersecting the front faces to provide cutting edges in the shearing plane, and screw and slot means cooperating with the terminal portions and with the blades to hold the backs of the latter against the bottoms of the channels and providing for adjustment of the blades lengthwise of the channels to secure proper relation of the cutting edges.

7. In a shear, the combination of relatively movable members having terminal portions provided with inner and opposed seats disposed crosswise of the shearing plane, blades having front and back faces arranged crosswise of the shearing plane and having at adjacent ends bevelled surfaces intersecting the front faces to provide cutting edges in the shearing plane, fastening devices for holding the blades in place with respect to said terminal portions with the back faces thereof engaging said seats, the terminal portions being relieved to provide outer surfaces which diverge outwardly with respect to the blades and seats from the cutting edge sides and the blades having their front and back faces converging in directions away from the cutting edges to facilitate movement of the shear with respect to stock.

In testimony whereof I affix my signature.

CHARLES B. GRAY.